(12) United States Patent
Reband et al.

(10) Patent No.: US 11,535,140 B2
(45) Date of Patent: *Dec. 27, 2022

(54) VEHICLE FLOOR MAT WITH SUPPORTS FOR IRREGULAR VEHICLE FLOOR

(71) Applicant: Thermoflex Corporation, Waukegan, IL (US)

(72) Inventors: David A. Reband, Antioch, IL (US); Robert Price, Mettawa, IL (US)

(73) Assignee: THERMOFLEX CORPORATION, Waukegan, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/074,436

(22) Filed: Oct. 19, 2020

(65) Prior Publication Data

US 2021/0031663 A1    Feb. 4, 2021

Related U.S. Application Data

(63) Continuation-in-part of application No. 15/385,601, filed on Dec. 20, 2016, now Pat. No. 10,807,509.

(60) Provisional application No. 62/271,952, filed on Dec. 28, 2018.

(51) Int. Cl.
*B60N 3/04* (2006.01)

(52) U.S. Cl.
CPC ............ *B60N 3/048* (2013.01); *B60N 3/044* (2013.01)

(58) Field of Classification Search
CPC ............................... B60N 3/048; B60N 3/044
USPC .................................................... 296/97.23
See application file for complete search history.

(56) References Cited

U.S. PATENT DOCUMENTS

| 2,275,575 A | 3/1942 | Vrooman |
| 4,491,556 A | 1/1985 | Fujii et al. |
| 6,794,013 B1 | 9/2004 | Iacovelli et al. |
| 6,933,036 B2 | 8/2005 | Whitaker |

(Continued)

FOREIGN PATENT DOCUMENTS

| EP | 2361803 A2 | 8/2011 |
| GB | 2171902 A | 9/1986 |

(Continued)

OTHER PUBLICATIONS

Extended EP Search Report and Corresponding Patentability Opinion relating to corresponding EP application No. EP21199526.1 dated Mar. 17, 2022 (9 pages).

*Primary Examiner* — D Glenn Dayoan
*Assistant Examiner* — Dana D Ivey
(74) *Attorney, Agent, or Firm* — Greer, Burns & Crain, Ltd

(57) ABSTRACT

A floor mat for placement on a vehicle floor, where the floor mat includes a body having a bottom wall, an upper surface, and a bottom surface, and a front wall extending from the bottom wall. The upper surface and the bottom surface extending along the bottom wall and the front wall. A first portion of the bottom surface of the bottom wall having a support structure provided with a variable height such that the shape of the support structure complements the irregularities in the vehicle floor, where the support structure extends from the bottom surface of the bottom wall, and a second portion of the bottom surface of the bottom wall has a flat surface, where upon the vehicle floor mat being placed on the vehicle floor, the support structure engages the irregularities in the vehicle floor so that the upper surface of the bottom wall is generally level.

14 Claims, 12 Drawing Sheets

(56) References Cited

U.S. PATENT DOCUMENTS

| | | |
|---|---|---|
| 9,248,769 B2 | 2/2016 | Price et al. |
| 9,586,509 B2 * | 3/2017 | Stroud .................. B60N 3/048 |
| 9,718,417 B2 | 8/2017 | Singh |
| 10,676,004 B2 * | 6/2020 | Milella, Jr. ............ B60N 3/048 |
| 10,807,509 B2 * | 10/2020 | Reband .................. B60N 3/048 |
| 2011/0076457 A1 | 3/2011 | Reichwein et al. |
| 2012/0324805 A1 | 12/2012 | Reichwein et al. |
| 2013/0136899 A1 | 5/2013 | Milella, Jr. et al. |
| 2013/0260083 A1 | 10/2013 | Price et al. |
| 2014/0103681 A1 | 4/2014 | MacNeil et al. |
| 2017/0036582 A1 | 2/2017 | MacNeil et al. |

FOREIGN PATENT DOCUMENTS

| | | |
|---|---|---|
| JP | S 63-64841 A | 3/1988 |
| JP | H 09-175248 A | 7/1997 |

* cited by examiner

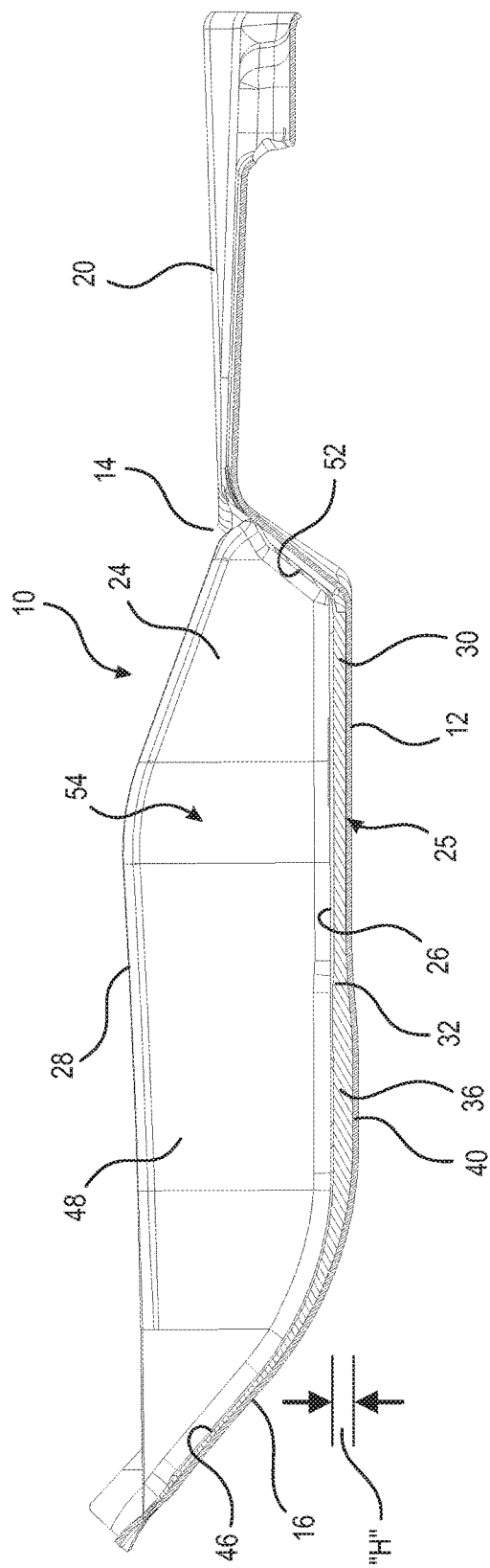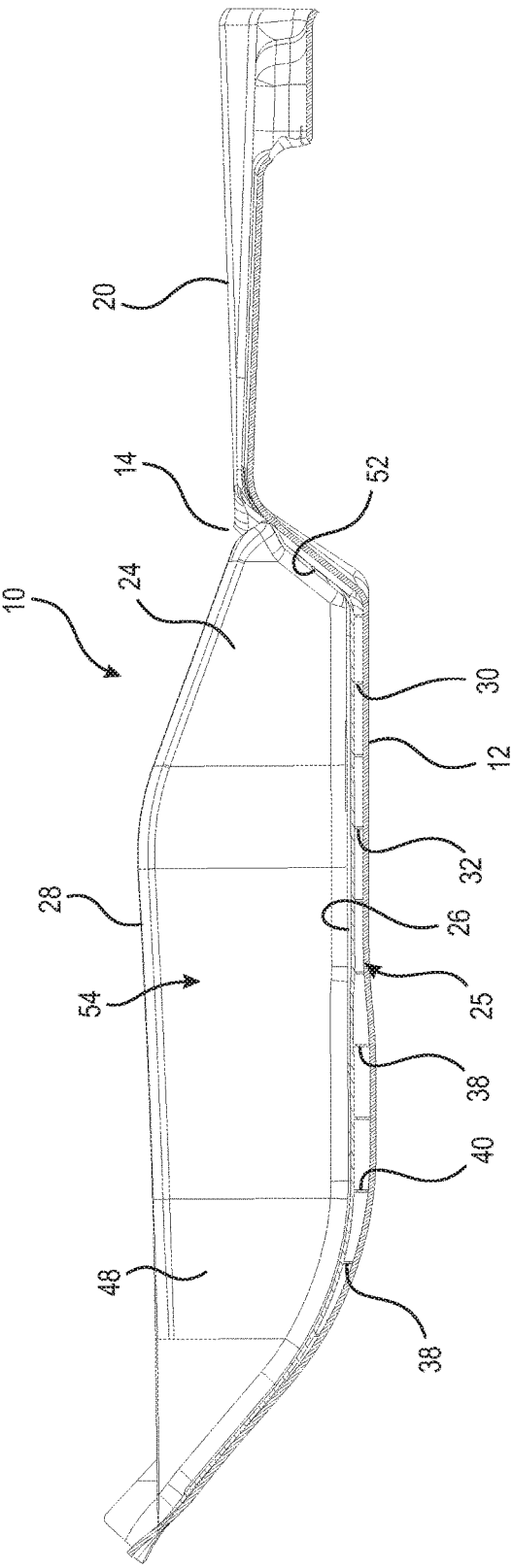

VEHICLE FLOOR MAT WITH SUPPORTS FOR IRREGULAR VEHICLE FLOOR

CROSS REFERENCE TO RELATED APPLICATIONS

This application is a continuation-in-part application of and claims priority to U.S. patent application Ser. No. 15/385,601 filed on Dec. 20, 2016, which claims priority to and the benefit of U.S. Provisional Application No. 62/271,952 filed on Dec. 28, 2015, wherein all of the patent applications referred to herein are incorporated by reference in their entirety.

BACKGROUND

The present invention relates to protective mats for flooring, and more specifically to such mats designed for use in vehicles for protecting vehicle carpeting from dirt, water damage and the like.

Conventional automotive vehicles, and particularly passenger vehicles, are manufactured with foot wells in front of the passenger seats for placement of driver and passenger feet while seated in the vehicle. To reduce vehicle weight and maintain structural integrity, vehicle floors, including foot wells, are configured using sheet metal formed with corrugations or other shapes. These shapes result in an uneven floor.

In the past, manufacturers provided carpet padding such as foam and the like beneath the carpeting to fill in the gaps or recesses formed by the corrugations. However, cost and weight reduction measures have resulted in a decrease in the use of such padding. Accordingly, in many vehicles, the placement of carpeting upon the vehicle floor fails to mask the irregular sheet metal surface, and results in an unsightly appearance.

Thus, there is a need for a vehicle floor mat that addresses the above problems.

SUMMARY

The above-listed needs are met or exceeded by the present improved vehicle floor mat which covers the vehicle floor and accommodates structural floor irregularities, while providing a generally level floor surface for the passengers' feet. This is achieved by providing a support structure extending below a lower surface of the floor mat to form a complementary shape with irregularities in the floor, such that upon the floor mat being placed in the vehicle foot well, an upper surface of the floor mat will be generally level. Another feature of the present mat is that it covers the entire foot well.

More specifically, a vehicle floor mat is provided for placement on a vehicle floor having surface irregularities, and includes a floor mat body having an upper surface, a peripheral edge, and a bottom surface. The bottom surface has an integral depending support structure provided with a variable height such that the shape of the support structure complements the irregularities in the vehicle floor. Upon the vehicle floor mat being placed on the vehicle floor, said support structure engages the irregularities and upper floor mat surface is generally level.

In another embodiment, a floor mat for placement on a vehicle floor is provided where the floor mat includes a body having a bottom wall, an upper surface, and a bottom surface, and a front wall extending from the bottom wall. The upper surface and the bottom surface extending along the bottom wall and the front wall. A first portion of the bottom surface of the bottom wall having a support structure provided with a variable height such that the shape of the support structure complements the irregularities in the vehicle floor, where the support structure extends from the bottom surface of the bottom wall, and a second portion of the bottom surface of the bottom wall has a flat surface, where upon the vehicle floor mat being placed on the vehicle floor, the support structure engages the irregularities in the vehicle floor so that the upper surface of the bottom wall is generally level.

In a further embodiment, a vehicle floor mat for placement on a vehicle floor having surface irregularities is provided where the floor mat includes a body having a bottom wall, an upper surface, and a bottom surface, and a front wall extending from the bottom wall, where the upper surface and the bottom surface extend along the bottom wall and the front wall. A first portion of the bottom surface of the bottom wall has a first support structure provided with a variable height such that the shape of the support structure complements the irregularities in the vehicle floor, and a second portion of the bottom surface has a second support structure, where the first support structure and the second support structure are different, and where upon the vehicle floor mat being placed on the vehicle floor, the first support structure and the second support structure each engage the irregularities in the vehicle floor so that the upper surface of the bottom wall is generally level.

In another embodiment, a vehicle floor mat for placement on a vehicle floor having surface irregularities is provided where the floor mat includes a body having a bottom wall, an upper surface, and a bottom surface, and a front wall extending from the bottom wall, where the upper surface and the bottom surface extend along the bottom wall and the front wall. A portion of the bottom surface of the front wall has a support structure provided with a variable height such that the shape of the support structure complements the irregularities in the vehicle floor, and the bottom surface of the bottom wall is flat, where upon the vehicle floor mat being placed on the vehicle floor, the support structure on the bottom surface of the front wall engages the irregularities in the vehicle floor so that the upper surface of the bottom wall is generally level.

BRIEF DESCRIPTION OF THE DRAWINGS

FIG. 5 is a cross-section taken along the line 5-5 of FIG. 4;

FIG. 6 is a cross-section taken along the line 6-6;

DETAILED DESCRIPTION

Figure 1:
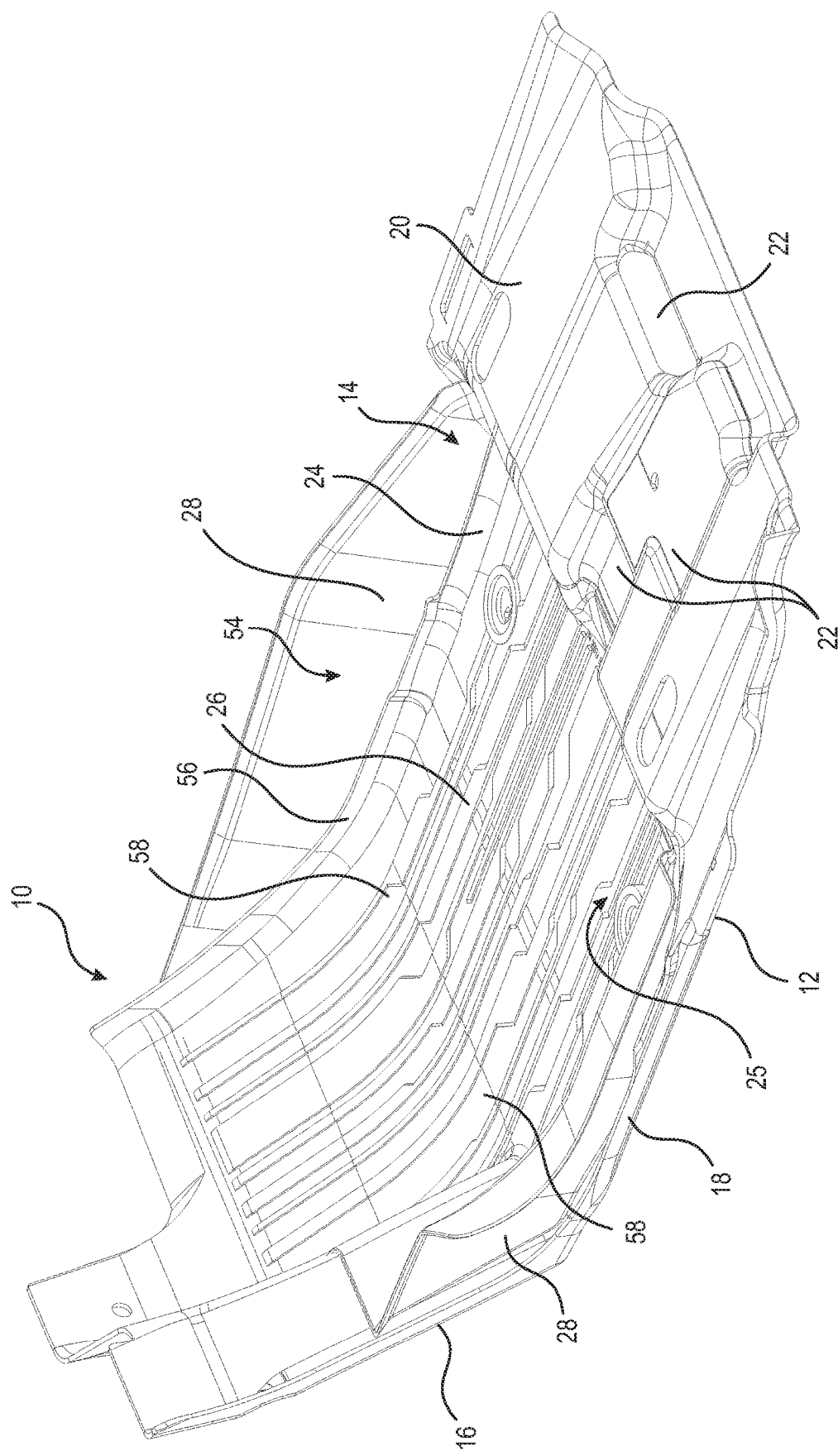
FIG. 1 is a top perspective view of the present floor mat placed on a vehicle floor foot well.

Referring now to FIG. 1, the present floor mat is generally designated 10, and is constructed and arranged for placement upon a vehicle floor 12 located in a vehicle foot well 14. Conventional passenger vehicles typically have four foot wells, each having a distinct shape. Thus, manufacturers of vehicle floor mats need to provide distinctly shaped mats for each foot well in each model of vehicle. Typically, floor mats are provided in sets, of two front and two rear floor mats. Besides the floor 12, the foot well 14 includes a front wall 16, sidewalls 18 and a seat mount surface 20.

Figure 7:
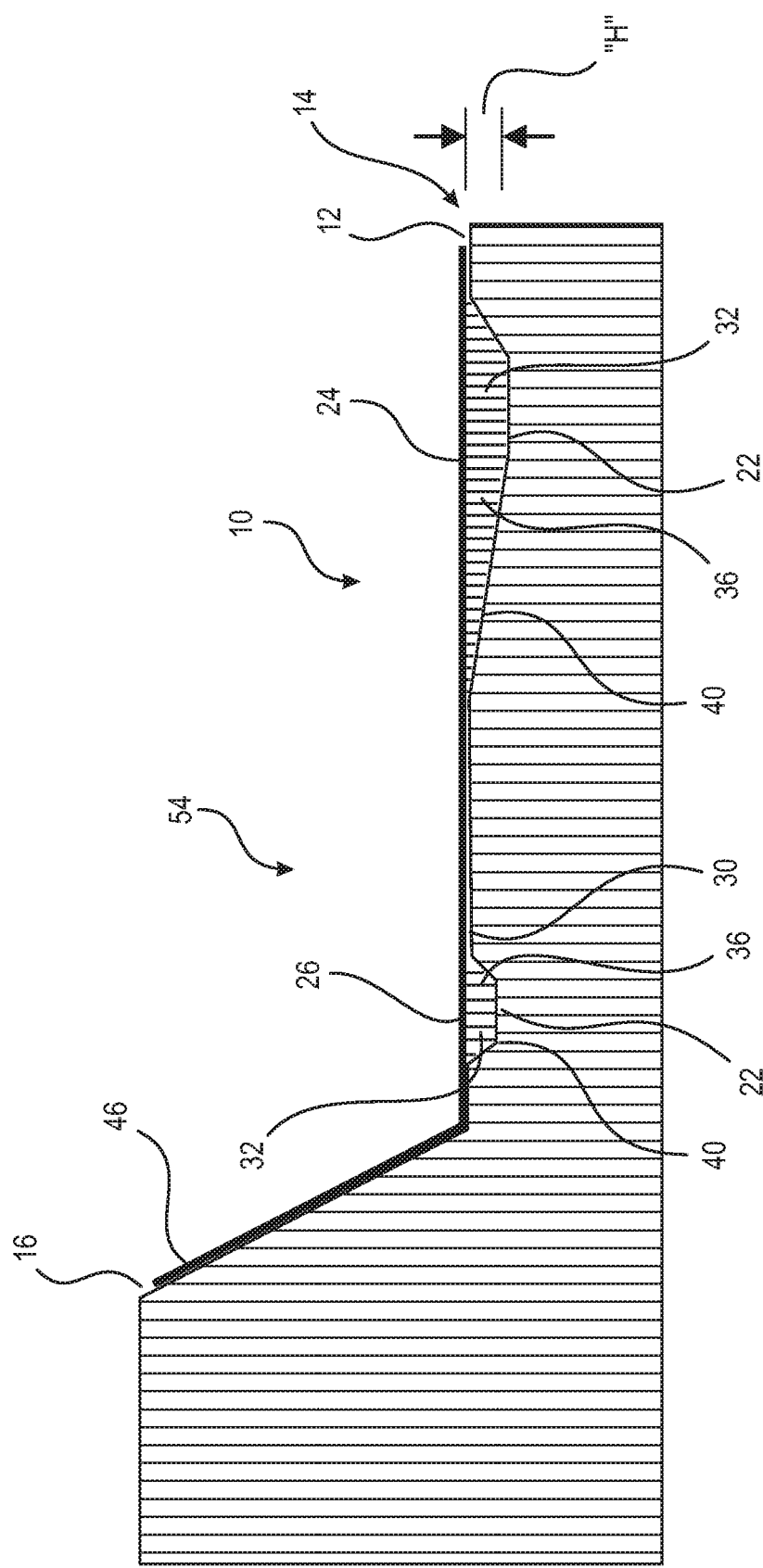
FIG. 7 is a schematic cross-section of the present floor mat on a vehicle floor.

As seen in FIGS. 1 and 7, the vehicle floor 12 and the seat mount surface 20 are not planar, and are provided with structural irregularities 22 including depressions and cavities formed in the respective sheet metal by stamping or the like to increase structural strength, provide mounting points for vehicle components, for facilitating assembly and for other reasons known to skilled practitioners in the automotive manufacturing art. Due to an increasing trend on the part of manufacturers to refrain from providing foam padding between the floor and any carpeting, there is a need for providing a floor mat that can accommodate the floor irregularities 22 in an aesthetically appealing manner.

Referring now to FIGS. 1-7, the present floor mat 10 includes a floor mat body 24 having a bottom wall 25, an upper surface 26, a peripheral edge 28, and a bottom surface 30. In the preferred embodiment, the floor mat 10 is made by injection molding; however other formation techniques are contemplated as known in the art. A feature of the present floor mat 10 is that upon being placed in the foot well 14, the upper surface 26 is generally level. This feature is achieved by providing the bottom surface with an integral depending support structure 32 having with a variable height such that the shape of the support structure complements the irregularities in the vehicle floor. Upon the vehicle floor mat 10 being placed on the vehicle floor 12, the support structure 32 engages the irregularities 22 and the upper floor mat surface 26 is generally level. Another feature of the present mat 10 is that it covers the entire foot well 14.

Figure 3:
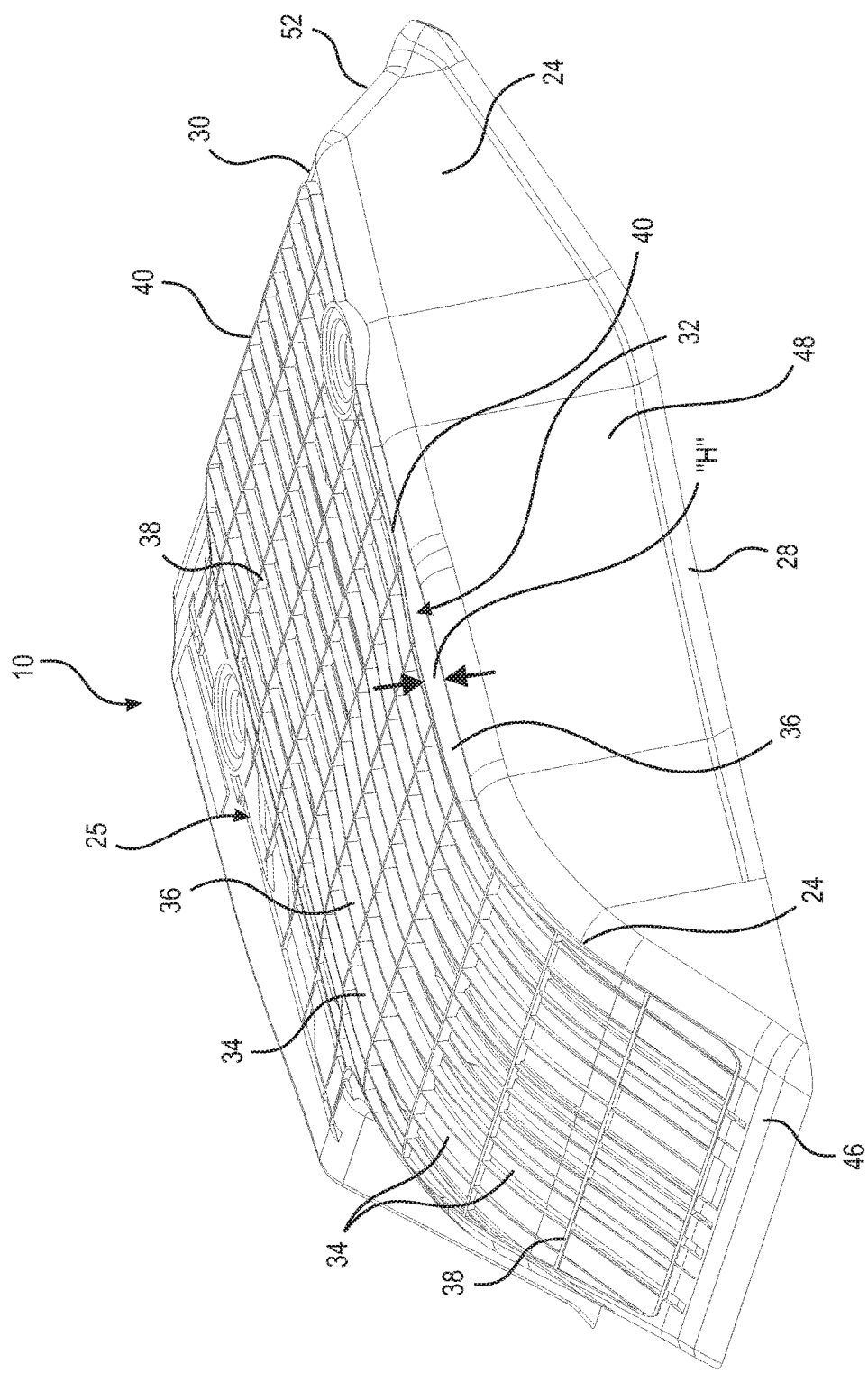
FIG. 3 is a bottom perspective view of the floor mat of FIG. 2.

As seen in FIG. 3, the preferred embodiment of the present support structure forms a grid defining rectangular apertures 34 using a plurality of spaced, generally parallel axial ribs 36 and transverse ribs 38. The spacing of the ribs 36, 38 is designed to suit the application so that the floor mat 10 adequately supports the feet of the passenger or driver. Preferably, the support structure 32 is configured for resisting deformation in the range of 5 pounds or more loading. Also, while rectangularly arranged ribs 36, 38 are shown, it is also contemplated that the support structure or grid 32 is optionally created using other geometric shapes, including but not limited to hexagons, pentagons, triangles, squares, etc. It will be seen from FIGS. 3, 5 and 6 that a height "H" of the support structure 32 varies with along at least one of a length and width of the bottom surface 30. These variations are designed to complement the irregularities 22 of the vehicle floor 12 so that the upper mat surface 26 remains generally level upon placement of the mat in the foot well 14.

Referring now to FIGS. 5, 6 and 7, a lower edge 40 of the ribs 36, 38 is preferably curved as needed to complement the floor irregularities 22. As seen in FIG. 7, depending on the particular configuration of the vehicle floor 12, the support structure 32 is optionally provided with isolated depending regions 42, 44 for vehicles where the vehicle floor irregularities 22 include a plurality of depressions, and the support structure 32 includes formations for filling the depressions so that the upper floor mat surface 26 is generally level when the mat is placed on the vehicle floor. Thus, depending on the design of the particular vehicle floor 12, the height "H" of the support structure 32 may range from 0-2 inches.

Figure 2:
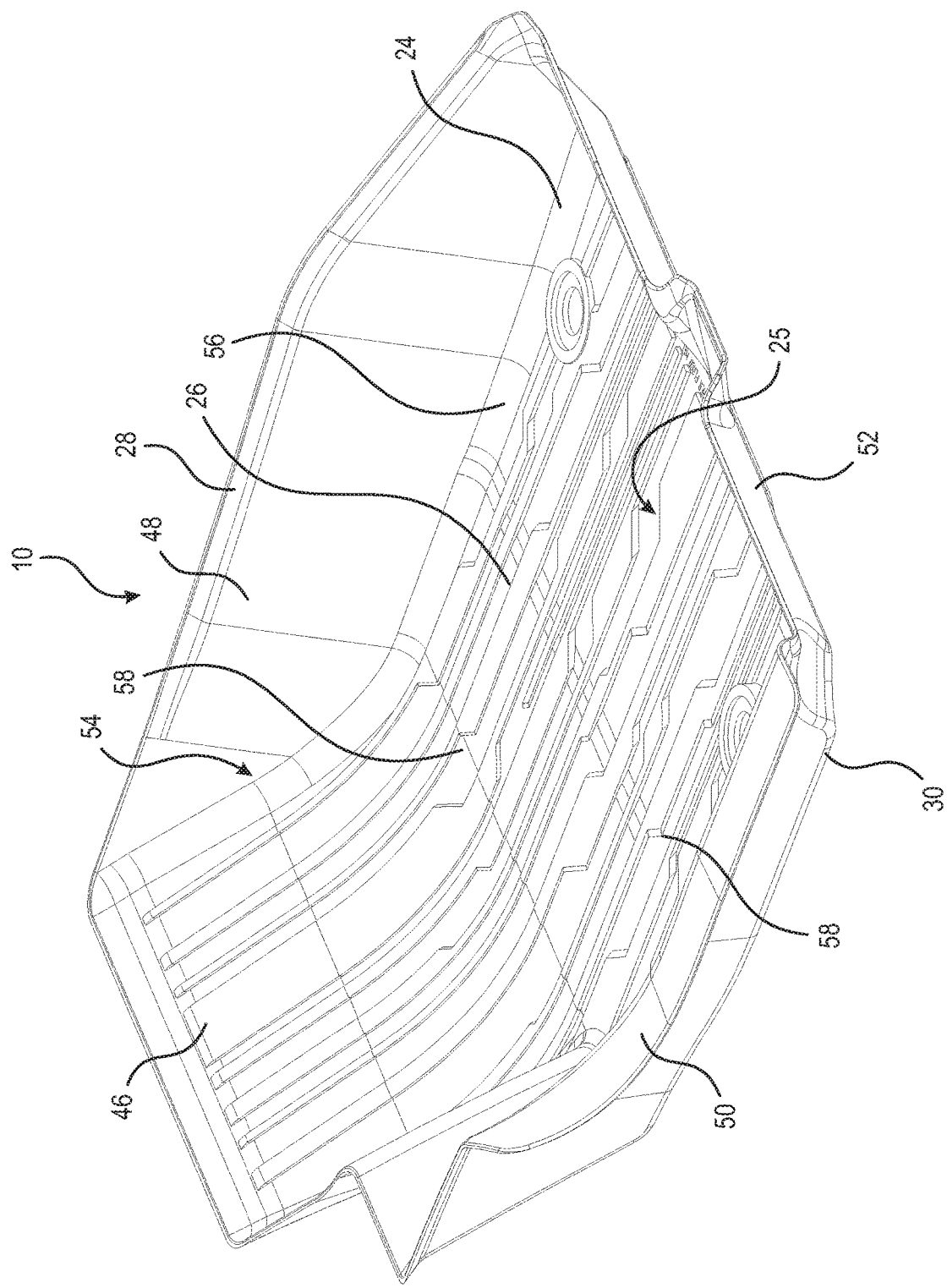
FIG. 2 is a top perspective view of the present floor mat.

Referring now to FIGS. 2 and 3, the mat 10 is constructed such that the peripheral edge 28 is formed as at least one generally vertically projecting wall extending from the bottom wall 25, specifically a front wall 46, an outer wall 48, and inner wall 50 and a rear wall 52. These walls combine to define a general bowl-shape for the floor mat 10 and define a space 54 for receiving the feet of the rider or driver. In addition, it is preferred that the outer wall 48 is structurally enhanced, such as through the use of a supplemental lip 56 for providing additional thickness which adds support to the mat 10.

Figure 4:
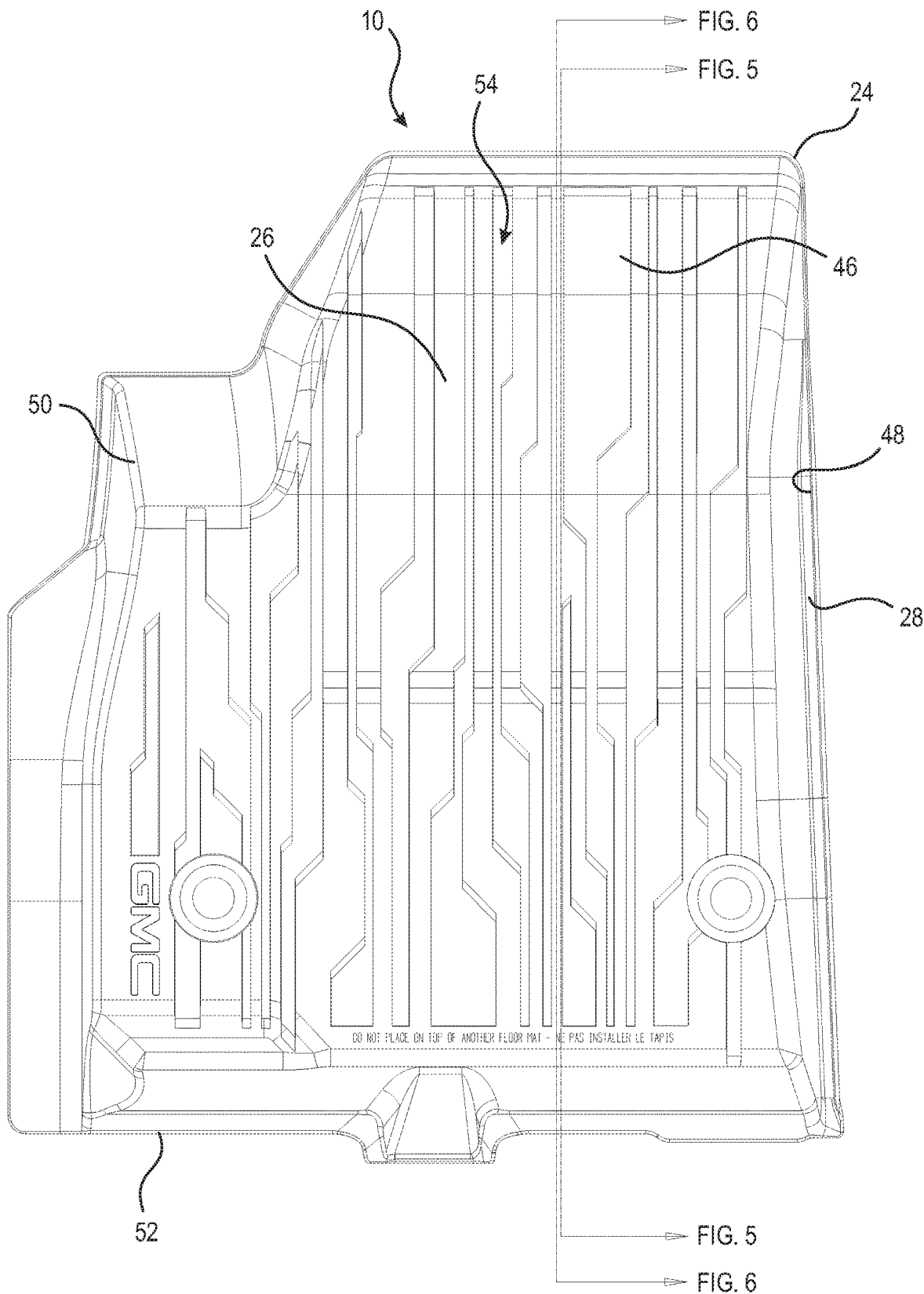
FIG. 4 is a plan view of the floor mat of FIG. 2.

Referring now to FIGS. 1, 2 and 4, as is known in the art, the upper surface 26 is provided with at least one vertically projecting gripping formation 58 in the form of ribs or walls to prevent the user's feet from slipping on the mat when wet.

Figure 8:
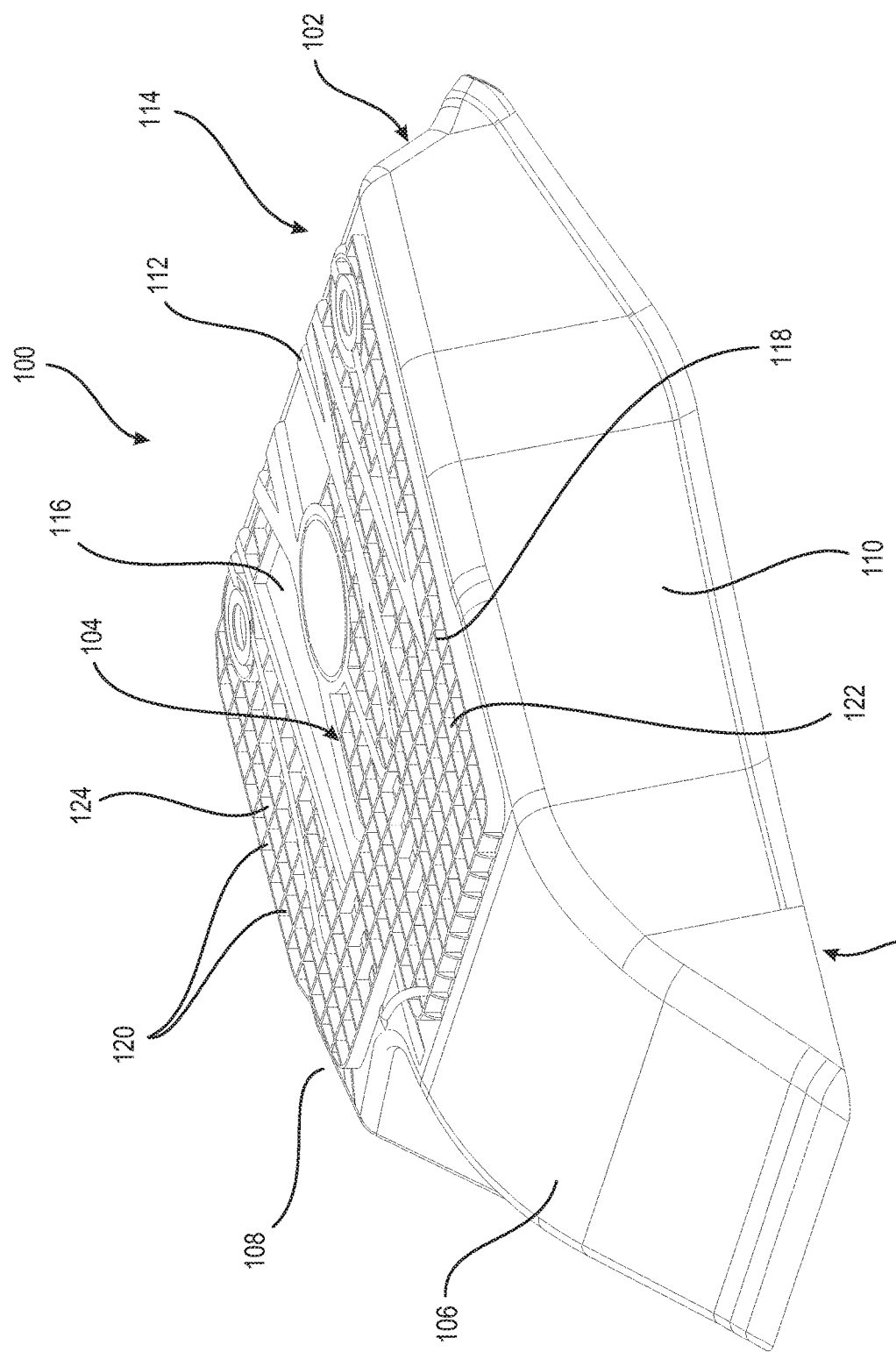
FIG. 8 is a bottom perspective view of another embodiment of the present floor mat.

Referring now to FIG. 8, another embodiment of the floor mat designated as 100, includes a body 102 having a bottom wall 104 and a front wall 106 extending from the bottom wall. Sidewalls 108, 110 extend from opposing sides of the bottom wall 104 and a rear wall 112 extends from a rear end 114 of the bottom wall and between the sidewalls 108, 110. In this embodiment, a portion of the bottom surface 116 of the bottom wall 104 includes a support structure 118 formed by transverse ribs 120 extending between the sidewalls 108, 110 and axial ribs 122 that extend from the rear wall 112 to the front wall 106 and intersect the transverse ribs to form a grid structure. The intersecting transverse and axial ribs 120, 122 of the support structure 118 form recessed areas 124 that engage irregularities on a floor of a vehicle so that an upper surface 126 of the floor mat 100 remains substantially flat or level when placed on the floor of the vehicle. In the illustrated embodiment, the axial ribs 122 and transverse ribs 120 forming each recessed area 124 each have a length. In the illustrated embodiment, the length of the axial ribs and the transverse ribs are the same. In another embodiment, the length of the axial ribs is greater than the length of the transverse ribs in the recessed areas. In a further embodiment, the length of the transverse ribs is greater than the length of the axial ribs. It should be appreciated that the axial ribs 122 and the transverse ribs 120 may be different lengths, the same length or be any suitable length. Further, the bottom surface 126 of the front wall 106 in this embodiment does not include the support structure. This enables the front wall 106 of the floor mat to engage a corresponding substantially flat surface in a vehicle.

Figure 9:
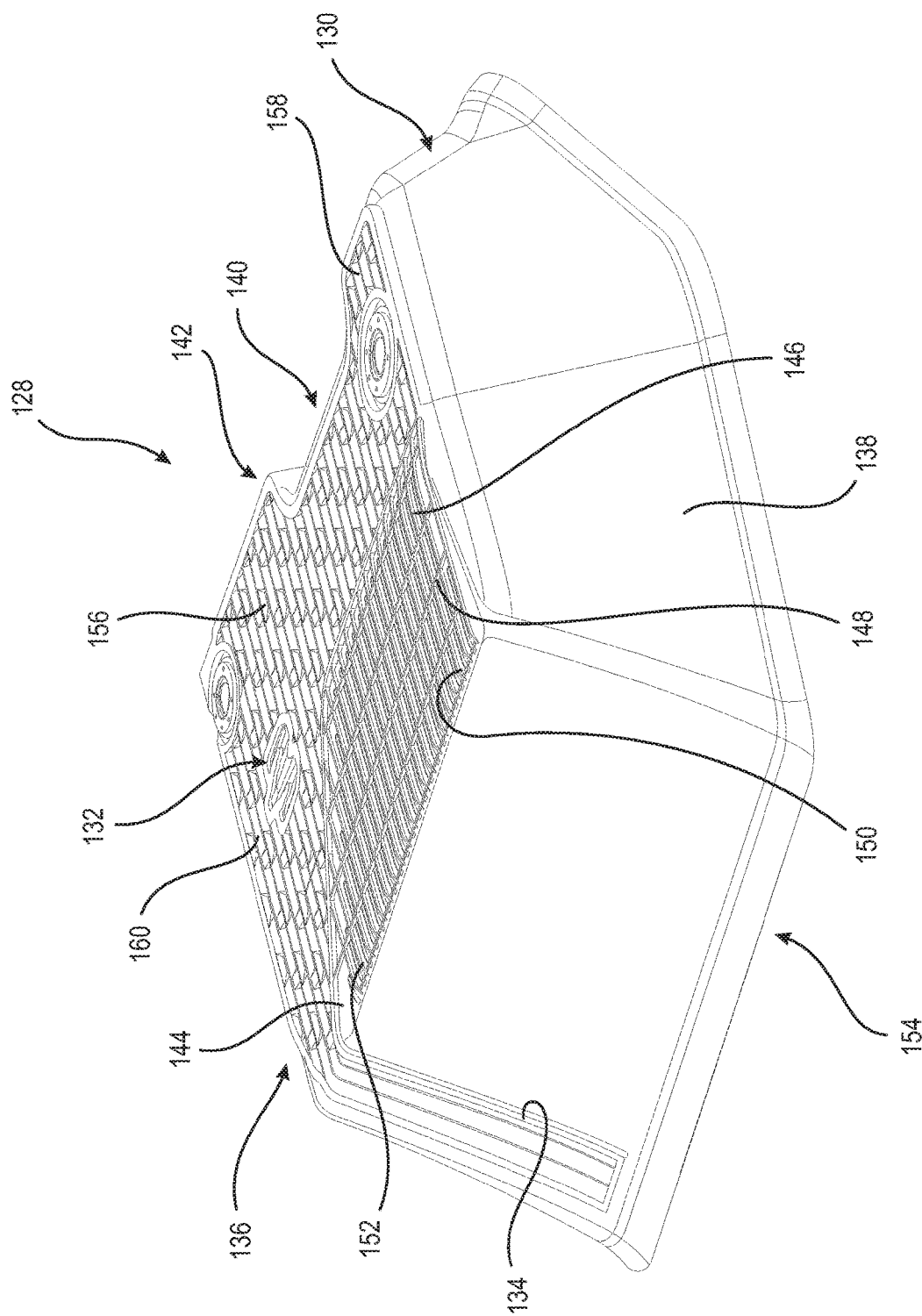
FIG. 9 is a bottom perspective view of a further embodiment of the present floor mat in which the bottom surface includes different support structures.

Referring now to FIG. 9, a further embodiment of the floor mat designated as 128, includes a body 130 having a bottom wall 132 and a front wall 134 extending from the bottom wall. Sidewalls 136, 138 extend from opposing sides of the bottom wall 132 and a rear wall 140 extends from a rear end 142 of the bottom wall 132 and between the sidewalls 136, 138. In this embodiment, a portion of the bottom surface 144 of the bottom wall 132 includes a first support structure 146 formed by transverse ribs 148 extending across the bottom surface and between the sidewalls, and axial ribs 150 that extend along a longitudinal axis of the bottom surface 144 of the bottom wall 132 between the front wall 134 and the rear wall 140. The transverse ribs 148 and the axial ribs 150 intersect each other to form a grid structure. As described above, the transverse ribs and the axial ribs may be any suitable length. The intersecting transverse and axial ribs of the first support structure 146 form recessed areas 152 that engage irregularities on a floor of a vehicle so that an upper surface 154 of the floor mat 128 remains substantially flat or level when placed on the floor of the vehicle. Another portion of the bottom surface 144 of the bottom wall 132 includes a second support structure 156. The second support structure 156 includes a plurality of ridges 158 and a plurality of grooves 160 extending longitudinally between the ridges. It should be appreciated that the ridges 158 and the grooves 160 may be any suitable size and may be any shape. In this embodiment, the first and second support structures 146, 156 are solely on the bottom surface 144 of the bottom wall 132. It should be appreciated that the first support structure 146, the second support structure 156 or both the first and second support structures may be on the bottom wall 132, the front wall 134, the rear wall 140 and/or the sidewalls 136, 138 of the body 130 of the floor mat 128. The first and second support structures 146, 156 enable the body 130 to accommodate the uneven and different configurations of a floor of a vehicle so that the upper surface 154 of the body 130 is substantially even or level when placed on the floor or the vehicle while also gripping the floor to hold the floor mat in place.

Figure 10:
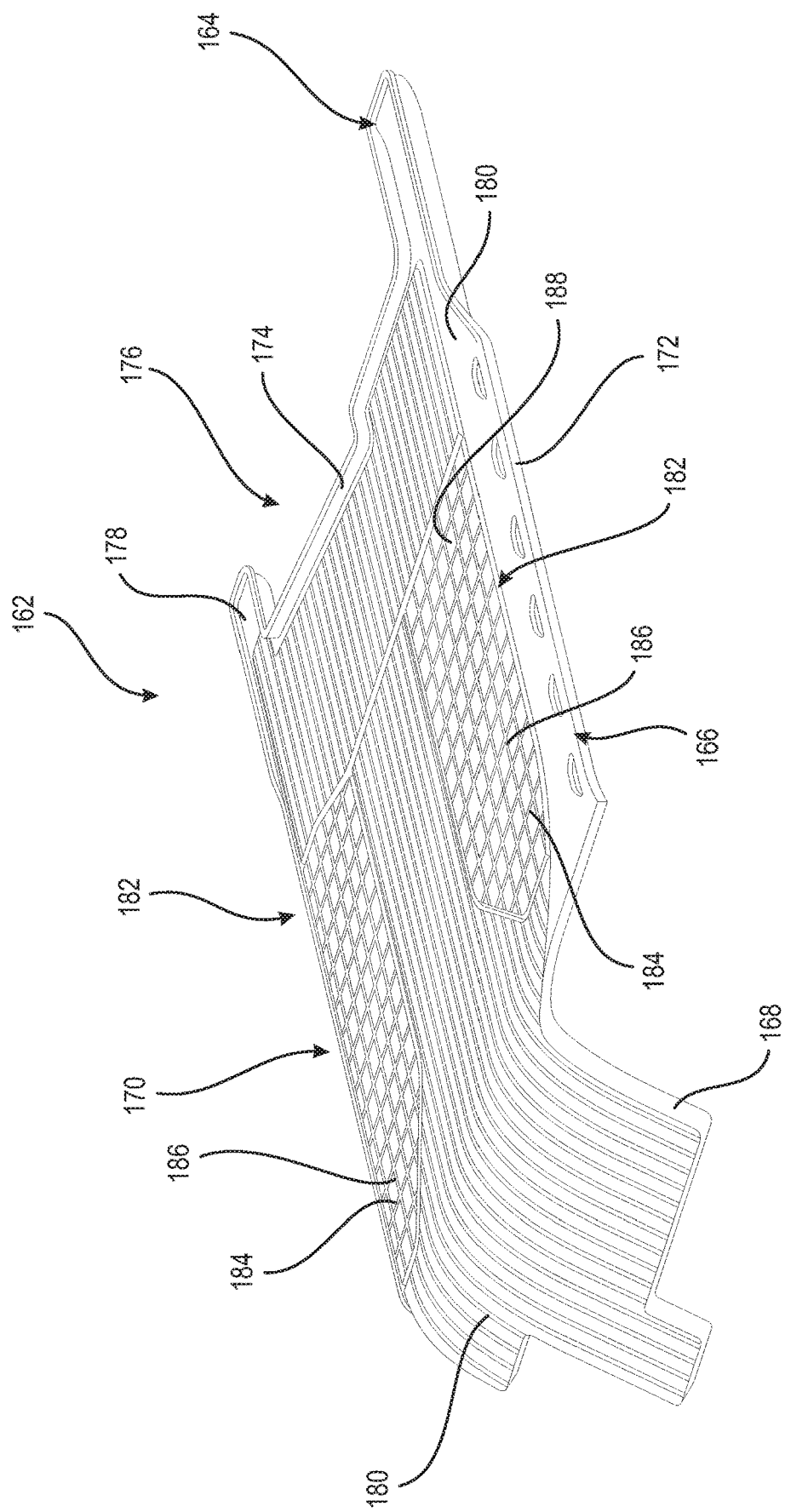
FIG. 10 is a bottom perspective view of another embodiment of the present floor mat in which part of the bottom surface includes a support structure.

Referring now to FIG. 10, another embodiment of the floor mat designated as 162, includes a body 164 having a bottom wall 166 and a front wall 168 extending from the bottom wall. Sidewalls 170, 172 extend from opposing sides of the bottom wall 166 and a rear wall 174 extends from a rear end 176 of the bottom wall 166 and between the sidewalls 170, 172. In this embodiment, a first portion of the bottom surface 178 of the bottom wall 166 includes a flat surface 180 or a plurality of flat surfaces 180, and a second portion of the bottom surface 178 of the bottom wall 166 includes a support structure 182 formed by transverse ribs 184 extending across the bottom surface 178 and between the sidewalls 170, 172, and axial ribs 186 that extend along a longitudinal axis of the bottom surface of the bottom wall between the front wall 168 and the rear wall 174. The transverse ribs 184 and the axial ribs 186 intersect each other to form a grid structure. The intersecting transverse and axial ribs 184, 186 of the support structure 182 form recessed areas 188 that engage irregularities on a floor of a vehicle so that an upper surface 190 of the floor mat 162 remains substantially flat or level when placed on the floor of the vehicle. It should be appreciated that the flat surface 180 may be a smooth flat surface or have grooves as shown in FIG. 10. It should be also appreciated that any portion or portions of the bottom surface 178 of the mat body 164 may include a flat surface or surfaces 180 and/or the support structure 182. It should also be appreciated that the support structure 182 may have ridges and recessed areas or be any suitable support structure.

Figure 11:
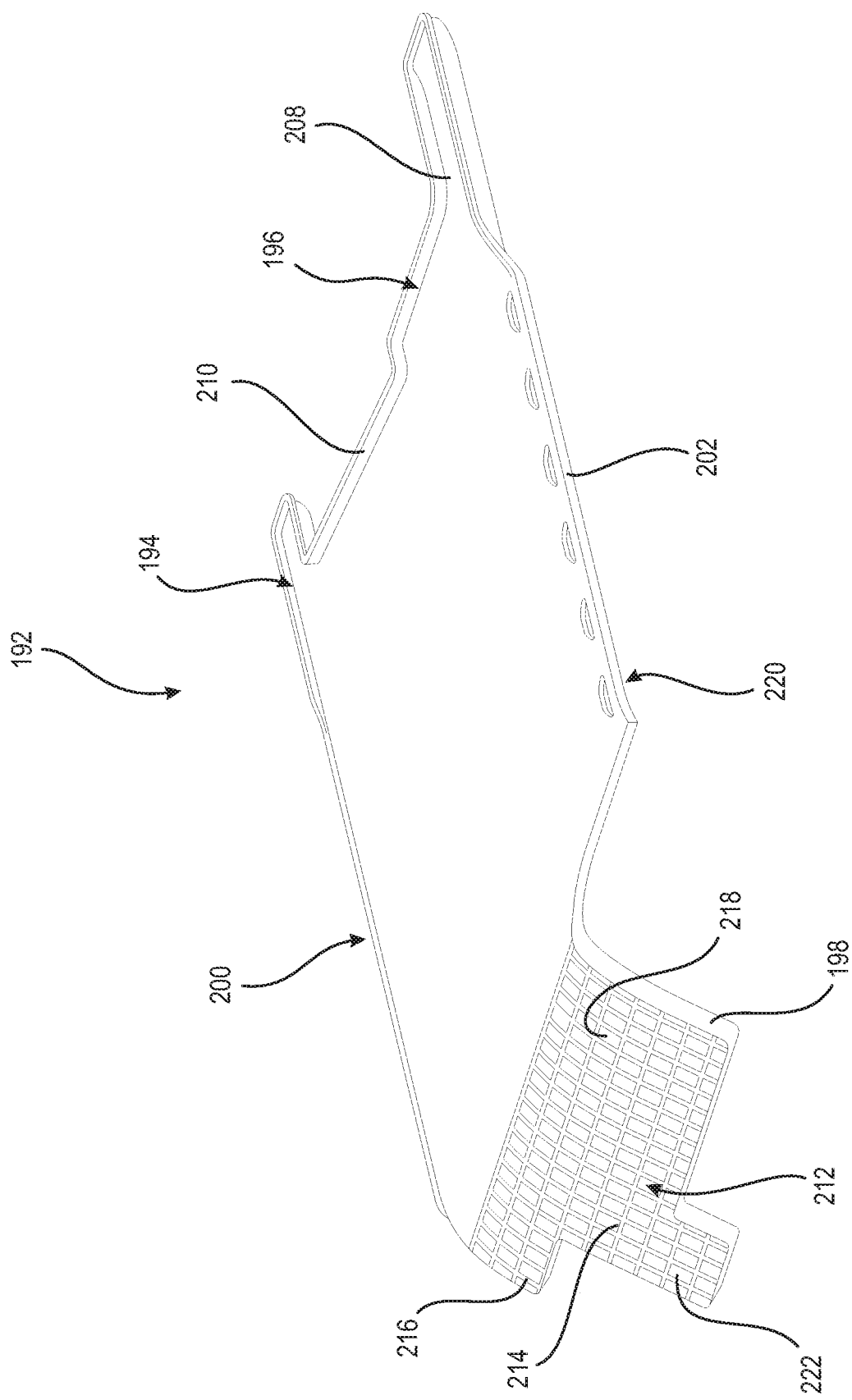
FIG. 11 is a bottom perspective view of a further embodiment of the present floor mat in which a bottom surface of the front wall includes a support structure.

Referring now to FIG. 11, a further embodiment of the floor mat designated as 192, includes a body 194 having a bottom wall 196 and a front wall 198 extending from the bottom wall. Sidewalls 200, 202 extend from opposing sides of the bottom wall 196 and a rear wall 204 extends from a rear end 206 of the bottom wall 196 and between the sidewalls 200, 202. In this embodiment, the bottom surface 208 of the bottom wall 196 is a flat surface 210 and does not include a support structure. Further, the front wall 198 includes a support structure 212 formed by transverse ribs 214 extending across the bottom surface 208 and between the sidewalls 200, 202, and axial ribs 216 that extend along a longitudinal axis of the bottom surface 208 of the bottom wall 196 between the front wall 198 and the rear wall 204. The transverse ribs 214 and the axial ribs 216 intersect each other to form a grid structure. The intersecting transverse and axial ribs 214, 216 of the support structure 212 form recessed areas 218 that engage irregularities on a floor of a vehicle so that an upper surface 220 of the floor mat 192 remains substantially flat or level when placed on the floor of the vehicle. It should be appreciated that any portion or portions of the bottom surface 222 of the front wall 198 may include the support structure 212. It should also be appreciated that the support structure 212 may have ridges and recessed areas or be any suitable support structure.

Figure 12:
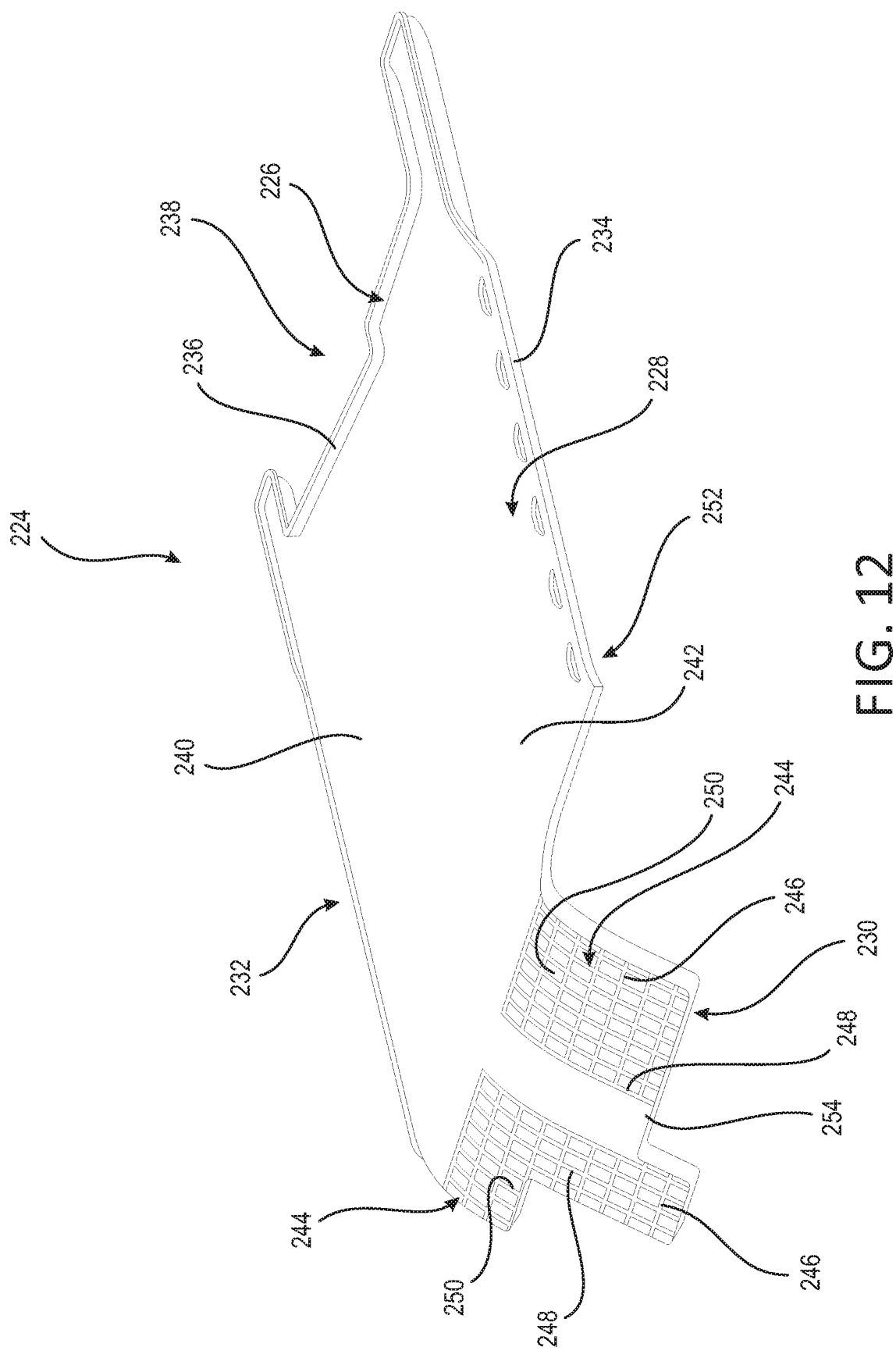
FIG. 12 is a bottom perspective view of another embodiment of the present floor mat in which part of the bottom surface of the front wall includes a support structure.

Referring now to FIG. 12, another embodiment of the floor mat designated as 224, includes a body 226 having a bottom wall 228 and a front wall 230 extending from the bottom wall. Sidewalls 232, 234 extend from opposing sides of the bottom wall 228 and a rear wall 236 extends from a rear end 238 of the bottom wall 228 and between the sidewalls 232, 234. Similar to the above embodiment, the bottom surface 240 of the bottom wall 228 is a flat surface 242 and does not include a support structure. In this embodiment, a portion or portions of the front wall 230 includes a support structure 244 formed by transverse ribs 246 extending across the bottom surface 240 and between the sidewalls 232, 234, and axial ribs 248 that extend along a longitudinal axis of the bottom surface of the bottom wall between the front wall and the rear wall. The transverse ribs 246 and the axial ribs 248 intersect each other to form a grid structure. The intersecting transverse and axial ribs 246, 248 of the support structure 244 form recessed areas 250 that engage irregularities on a floor of a vehicle so that an upper surface 252 of the floor mat 224 remains substantially flat or level when placed on the floor of the vehicle. In the above embodiment, any portion or portions of the bottom surface 254 of the front wall 230 may include the support structure 244. The other portions of the bottom surface 254 of the front wall 230 may be a flat surface, as shown in FIG. 10, a different support structure or have any suitable surface or structure. It should also be appreciated that the support structure 244 may have ridges and recessed areas or be any suitable support structure.

Figure 13:
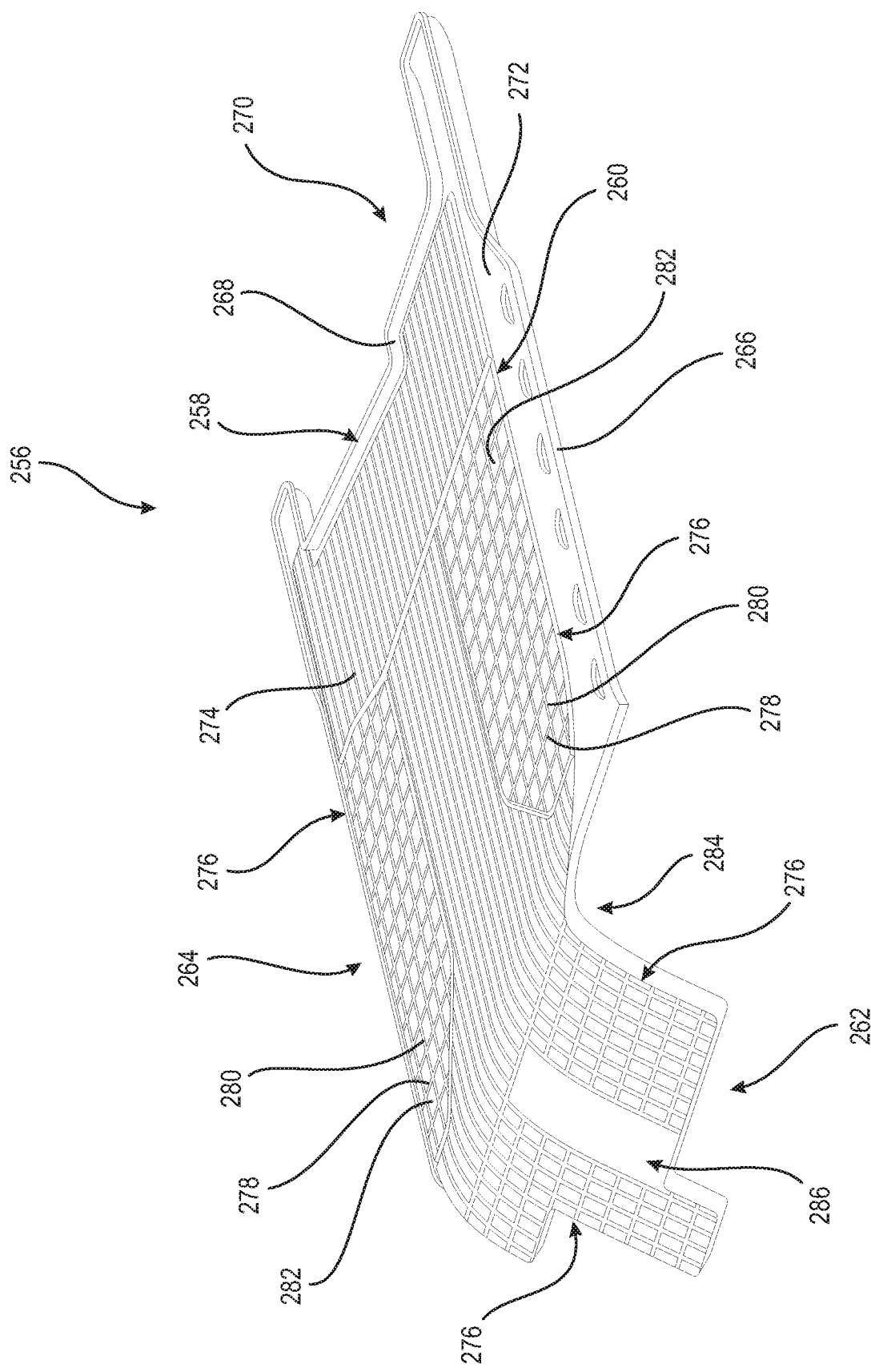
FIG. 13 is a bottom perspective view of a further embodiment of the present floor mat in which part of the bottom surface of the front wall and part of the bottom surface of the bottom wall includes a support structure.

Referring now to FIG. 13, another embodiment of the floor mat designated as 256, includes a body 258 having a bottom wall 260 and a front wall 262 extending from the bottom wall. Sidewalls 264, 266 extend from opposing sides of the bottom wall 260 and a rear wall 268 extends from a rear end 270 of the bottom wall and between the sidewalls. In this embodiment, a first portion of the bottom surface 272 of the bottom wall 260 is a flat surface 274 and a second portion of the bottom surface 272 of the bottom wall 260 includes a support structure 276 formed by transverse ribs 278 extending across the bottom surface 272 of the bottom wall 260 and between the sidewalls 264, 266, and axial ribs 280 that extend along a longitudinal axis of the bottom surface of the bottom wall between the front wall 262 and the rear wall 268. The transverse ribs 278 and the axial ribs 280 intersect each other to form a grid structure. The intersecting transverse and axial ribs 278, 280 of the support structure 276 form recessed areas 282 that engage irregularities on a floor of a vehicle so that an upper surface 284 of the floor mat 256 remains substantially flat or level when placed on the floor of the vehicle. It should be appreciated that the flat surface 274 may be a smooth or level flat surface, may include grooves or may have any substantially flat or level surface. It should also be appreciated that any suitable portion or portions of the bottom surface 272 of the bottom wall 260 may be a flat surface 274 and/or include the support structure 276.

Additionally, a first portion of the bottom surface 286 of the front wall 262 includes a flat surface and a second portion of the bottom surface of the front wall includes the above support structure 276. It should be appreciated that any suitable portion or portions of the bottom surface 286 of the front wall 262 may be a flat surface and/or include the support structure. It should also be appreciated that the support structure 276 on the bottom surface 272 of the bottom wall 260 and the bottom surface 286 of the front wall 262 may have ridges and recessed areas or include any suitable support structure.

While a particular embodiment of the present vehicle floor mat for irregular vehicle floor has been described herein, it will be appreciated by those skilled in the art that changes and modifications may be made thereto without departing from the invention in its broader aspects and as set forth in the following claims.

What is claimed is:

1. A vehicle floor mat for placement on a vehicle floor having surface irregularities, the floor mat comprising:
    a body having a bottom wall, an upper surface, and a bottom surface, and a front wall extending from said bottom wall, said upper surface and said bottom surface extending along said bottom wall and said front wall;
    a first portion of said bottom surface of said bottom wall having a support structure provided with a variable height such that the shape of said support structure complements the irregularities in the vehicle floor, said support structure extending from said bottom surface of said bottom wall and including axial ribs and transverse ribs that form a grid, said axial ribs and said transverse ribs forming rectangular shapes with recessed areas;
    a second portion of said bottom surface of said bottom wall having a flat surface,
    wherein upon said vehicle floor mat being placed on the vehicle floor, said support structure engages the irregularities in the vehicle floor so that said upper surface of said bottom wall is generally level.

2. The floor mat of claim 1, wherein said support structure has a height that varies in at least one of a length and a width of the floor mat body.

3. The floor mat of claim 1, wherein said bottom surface of said front wall includes said support structure.

4. A vehicle floor mat for placement on a vehicle floor having surface irregularities, the floor mat comprising:
    a body having a bottom wall, an upper surface, and a bottom surface, and a front wall extending from said bottom wall, said upper surface and said bottom surface extending along said bottom wall and said front wall;
    a first portion of said bottom surface of said bottom wall having a first support structure provided with a variable height such that the shape of said support structure complements the irregularities in the vehicle floor;
    a second portion of said bottom surface having a second support structure, wherein said first support structure and said second support structure are different;
    wherein upon said vehicle floor mat being placed on the vehicle floor, said first support structure and said second support structure each engage the irregularities in the vehicle floor so that said upper surface of said bottom wall is generally level.

5. The floor mat of claim 4, wherein one of said first support structure or said second support structure includes axial ribs and transverse ribs that form a grid.

6. The floor mat of claim 5, wherein said axial ribs and said transverse ribs form rectangular shapes with recessed areas.

7. The floor mat of claim 4, wherein one of said first support structure or said second support structure includes ridges and grooves formed between said ridges.

8. The floor mat of claim 4, wherein said bottom surface of said front wall is flat.

9. The floor mat of claim 4, wherein said bottom surface of said front wall includes one of said first support structure or said second support structure.

10. The floor mat of claim 4, wherein a portion of said bottom surface of said front wall includes one of said first support structure or said second support structure.

11. The floor mat of claim 4, wherein a portion of said bottom surface of said bottom wall is flat.

12. A vehicle floor mat for placement on a vehicle floor having surface irregularities, the floor mat comprising:
    a body having a bottom wall, an upper surface, and a bottom surface, and a front wall extending from said bottom wall, said upper surface and said bottom surface extending along said bottom wall and said front wall;
    a portion of said bottom surface of said front wall having a support structure provided with a variable height such that the shape of said support structure complements the irregularities in the vehicle floor, and said bottom surface of said bottom wall is flat,
    wherein said support structure includes axial ribs and transverse ribs that form a grid, said axial ribs and said transverse ribs forming rectangular shapes with recessed areas, and
    wherein upon said vehicle floor mat being placed on the vehicle floor, said support structure on said bottom surface of said front wall engages the irregularities in the vehicle floor so that said upper surface of said bottom wall is generally level.

13. The floor mat of claim 12, wherein the entire bottom surface of said front wall has said support structure.

14. The floor mat of claim 12, wherein a portion of said bottom surface of said bottom wall has said support structure.

* * * * *